United States Patent [19]

Anabtawi et al.

[11] Patent Number: 4,810,859

[45] Date of Patent: Mar. 7, 1989

[54] ELECTRICAL WARMING DEVICE FOR CONTAINERS

[75] Inventors: Anan A. Anabtawi, Houston; Keith M. Logan, Humble, both of Tex.

[73] Assignee: Kiddiecorp., Inc., Houston, Tex.

[21] Appl. No.: 108,682

[22] Filed: Oct. 15, 1987

[51] Int. Cl.[4] ............................................. H05B 3/58
[52] U.S. Cl. .................................. 219/535; 219/528; 219/529
[58] Field of Search ............... 219/535, 526, 527, 528, 219/529, 536, 542, 548, 549, 211, 212, 311; 128/399, 400, 401, 402

[56] References Cited

U.S. PATENT DOCUMENTS 3,393,297 7/1968 Hart ..................................... 219/528
3,527,925 9/1970 Toyooka et al. ............... 219/528 X Primary Examiner—E. A. Goldberg
Assistant Examiner—M. M. Lateef
Attorney, Agent, or Firm—Dodge, Bush & Moseley

[57] ABSTRACT

An electrical warming device (13) for wrapping around the outer circumference of a container (10) for warming moist tissues therein. The heating device (13) has an inner heating pad (18) inserted within the open end (46) of an outer cover (20). A marginal side portion (60) of outer cover (20) may be folded inwardly to shorten the width of the outer cover (20) to adapt the heating device (13) for use on a container (10A) of a lesser height. The heating device (13) is held in secured position about the container (10) by matching Velcro strips (74, 76) on inner and outer overlapping end portions (14, 15) and by tied bows (16) of ribbon ties (66, 68) on overlapping end portions (14, 15).

16 Claims, 3 Drawing Sheets

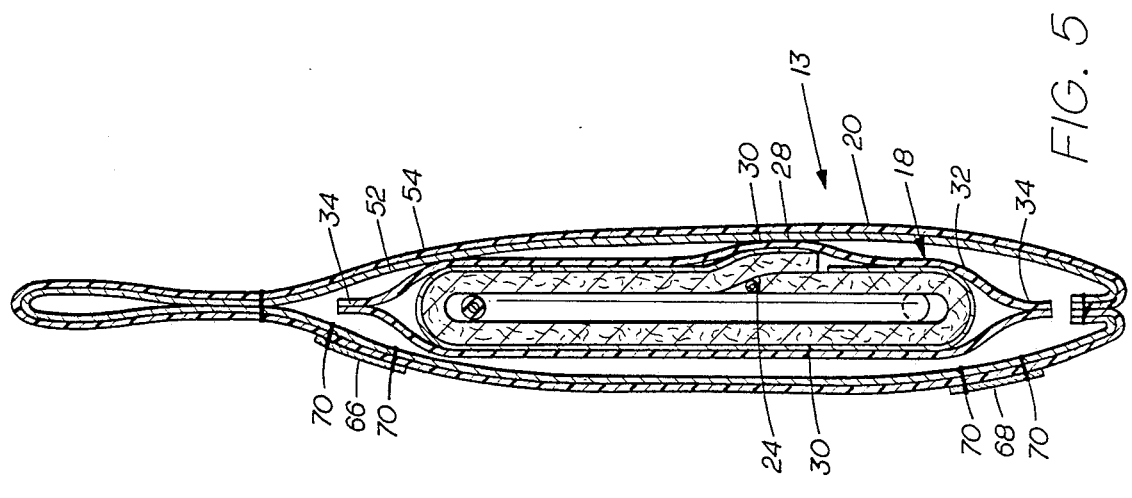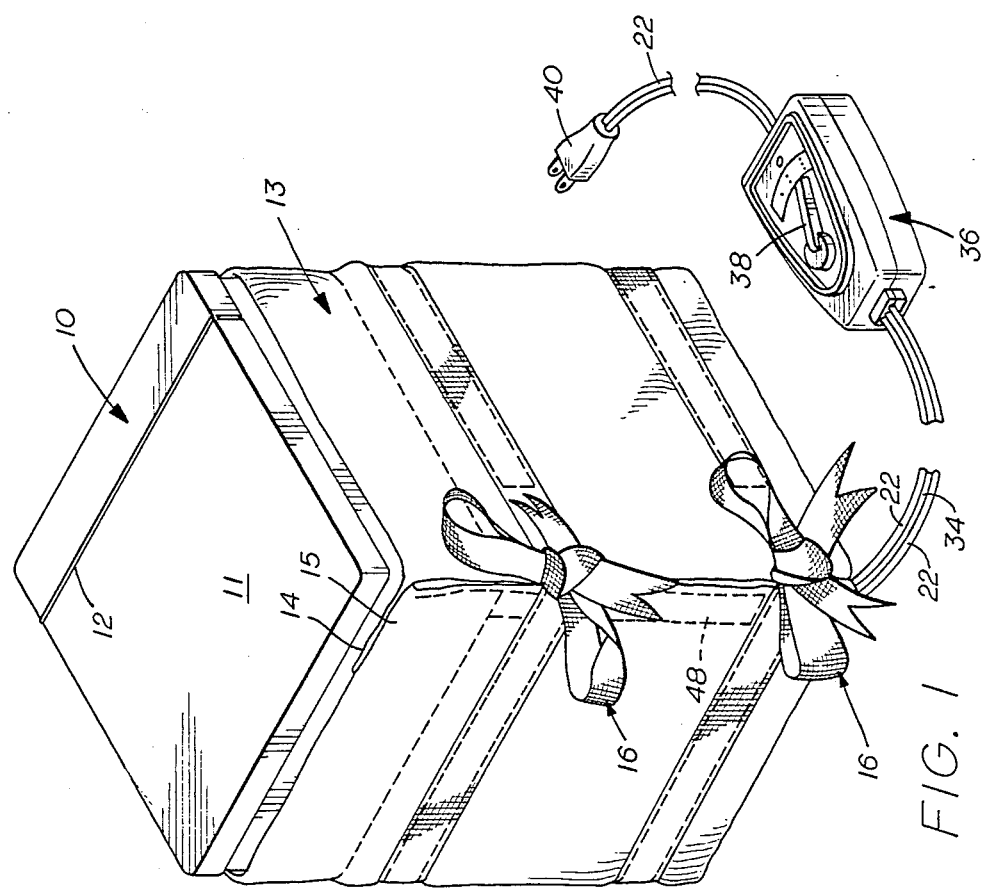

ELECTRICAL WARMING DEVICE FOR CONTAINERS

BACKGROUND OF THE INVENTION

This invention relates to an improved electrical warming device for containers and more particularly to an electrical warming device adapted to be wrapped around the outer periphery of a container having moist tissues therein for warming such tissues before use.

Heretofore, such as shown in U.S. Pat. No. 4,065,660, dated Dec. 27, 1977, an electrical heating pad has been wrapped around and secured to a container, such as a feeding bottle for baby, for heating the bottle prior to use by the baby. However, such a heating pad was utilized in combination with a base support on which the container or bottle to be warmed is supported. Further, the heating pad has been combined with a specific support to form an integral part of the support.

U.S. Pat. No. 3,079,486, dated Feb. 26, 1963 shows a wraparound electrical heating element for objects, such as a bottle, glove, or other wearing apparel. However, a specific one piece heating device has been designed for fitting around each particular object and is not adapted for fitting around objects of different dimensions and sizes.

Other heating pads have been secured about various objects, such as pipes, for heating the pipe, as illustrated in U.S. Pat. No. 3,393,297 dated July 16, 1968. While separate heating units are shown which are positioned in pockets, the heating units comprise resistance wire elements with exposed electrical couplings without any covering, and the heating units are separated from the metal body to be heat treated only by a sheet of wire mesh material.

SUMMARY OF THE PRESENT INVENTION

The present invention is particularly directed to an improved electrical warming device for a container having a plurality of moist tissues therein adapted to be individually withdrawn from the container for use in wiping babies or the like. So-called baby wipes comprising moist tissues may at times become cold or at least provide a cool feeling to the skin of a baby when used which can disturb and cause crying of to an annoying level at times. Thus, it is desirable to provide baby wipes which are warmed to a predetermined temperature, such as around 110° F., at all times so that a gentle warm feeling is provided by the baby wipes against the warm sensitive skin of a baby without any discomfort.

The warming device comprises a separate heating pad which is removably inserted within the open end of a cover for the heating pad and the open end portions of the cover are closed upon insertion of the heating pad such as by matching Velcro strips. The cover preferably has its outer side embossed or formed with various predetermined designs. Upon deterioration or malfunctioning of the heating pad, the heating pad may be removed from the outer cover and replaced with another pad.

The warming device is generally rectangular in shape and is adapted to be wrapped about the outer periphery of the container with overlapping end portions secured in tight relation about the container. The overlapping end portions permit the warming device to be utilized about containers having various circumferential or peripheral dimensions. To hold the overlapping end portions in place while ribbon or string ties on the end portions are tied together, matching Velcro strips are provided on the overlapping end portions.

The outer cover has a width substantially greater than the width of the heating pad to form a foldable marginal side portion extending beyond the inner heating pad. The opposite sides of the cover are joined together such as by stitching along a line forming the foldable marginal side portion and the heating pad is inserted within the cover adjacent the marginal side portion. Upon folding of the marginal side portion or strip inwardly to lap the heating pad, a shorter width heating device is provided to adapt the heating device to be used with a container having a lesser height.

It is an object of the present invention to provide an improved electrical warming device for wrapping around and securing to a container having a plurality of moist tissues therein for warming the tissues before use.

It is a further object of the invention to provide such an improved electrical warming device having a removable inner electrical heating pad insertable within the open end of an outer cover which is closed after insertion of the heating pad.

An additional object of the invention is to provide a heating device of a generally rectangular shape for wrapping around the outer periphery of the container and particularly adapted to be utilized with containers of different circumferential sizes and different heights.

Other objects, features, and advantages of this invention will become more apparent after referring to the following specification and drawings.

BRIEF DESCRIPTION OF THE DRAWINGS

FIG. 1 is a perspective view of the improved electrical warming device forming the present invention wrapped around and secured to a container having a plurality of moist tissues therein;

FIG. 5 is an enlarged sectional view taken generally along line 5—5 of FIG. 3;

Figure 2:
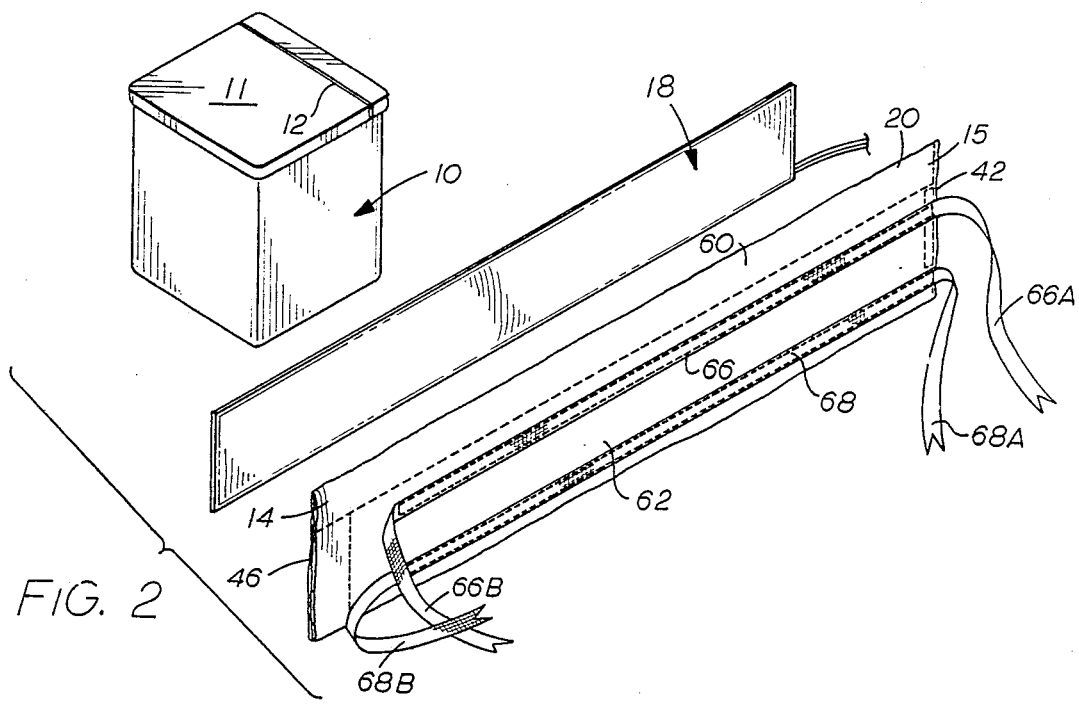
FIG. 2 is an exploded view of the heating device removed from the container with the inner electrical heating pad removed from the outer cover.

Referring now to the drawings and particularly to FIG. 1 for a better understanding of the invention, a container of a generally rectangular shape is shown at 10 having a plurality of moist tissues stacked therein adapted to be removed individually from the upper end of the container upon opening of lid 11 about hinge 12. The electrical warming device comprising the present invention is indicated generally at 13 and is shown wrapped about the outer periphery of container 10 with respective inner and outer overlapping end portions 14, 15 secured by suitable bows indicated generally at 16. Heating device 13 is of a generally rectangular shape and includes an inner heating pad generally indicated 18 within an outer cover generally indicated at 20.

Figure 6:
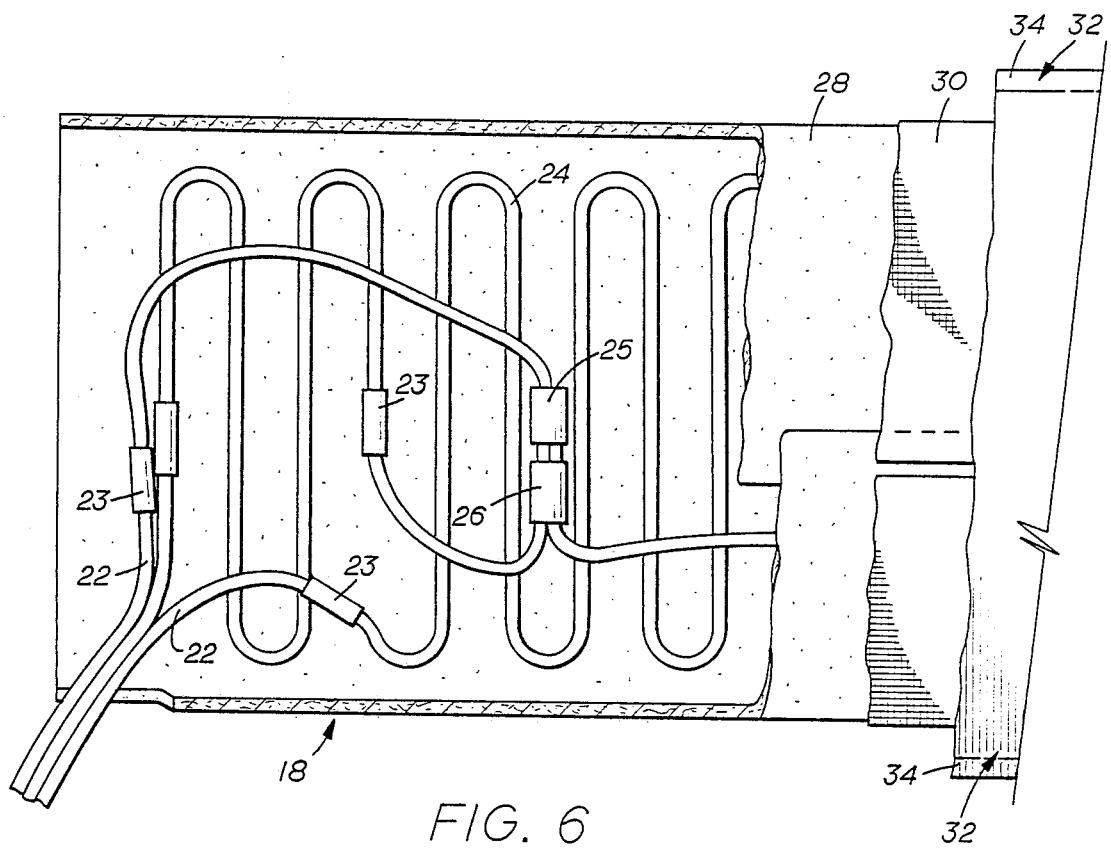
FIG. 6 is a fragmentary longitudinal sectional view of the heating pad removed from the cover of the heating device and showing certain layers in elevation.

As shown particularly in FIG. 5 and 6, heating pad 18 includes insulated conductor wires 22 connected by electrical couplings 23 to electrical resistance wires 24 arranged in a suitable pattern. Three thermostats 25 are provided which include bimetallic stripes activated at different temperatures. Also, a thermal fuse 26 which is activated at a predetermined high temperature is utilized to cut the flow of electrical current in the event of malfunctioning of thermostats 25. A relatively soft inner fabric layer 28 such as felt is positioned about wires 24 and an intermediate layer 30 of heat resistant material, such as fiberglass, is provided over inner layer 28. An outer plastic layer 32 is positioned about the entire heat pad 18 and has outer marginal edges heat sealed about its entire periphery to form an outer waterproof covering for heating pad 18.

Conductor wires 22 extend from a corner 33 of heating pad 18 and outer layer 32 and are covered by outer plastic layer 32 adjacent corner 33. A thermostat control lead 34 between conductor wires 22 along with wires 22 extend to a temperature control generally indicate 36. Control 36 has a pointer or indicator 38 thereon which may be manually set at off, low, medium, and high positions. The three thermostats 25 are selectively utilized for the desired temperature setting. A plug 40 on the extending end of conductor wires 22 from control 36 is adapted to be connected to an electric outlet for a source of electrical energy. A heating pad which has been found to be satisfactory is a forty-two (42) watt, one hundred twenty (120) volt heating pad manufactured under style BWW-1 by Northern Electric Company, 5224 North Kedzie, Chicago, Ill. 60625.

Referring now to outer cover 20, one end 42 thereof is closed by stitching 44 and its other end 46 is open. For closing end 46 coacting matching strips 48 and 50 of Velcro on opposed inner surfaces of open end 42 are pressed together. As well known, Velcro matching strips 48, 50 are formed of a nylon material with one strip 48 having a surface of tiny hooks thereon and the other strip 50 in the form of an adhesive pile. Strips 48 and 50 may be pressed together for fastening and pulled apart for unfastening.

Outer cover 20 is formed from a sheet material comprising an inner liner 52 of a soft fabric material and an outer plastic liner 54 adhesively secured to inner liner 52 by a suitable heat sealing process. Prior to securement to outer plastic liner 54, inner fabric liner 52 may have a suitable design dyed onto the fabric material which may be formed of fifty (50) percent polyester and fifty (50) per cent cotton. Cover 20 is formed from the sheet material by stitching along end 42 and an upper edge. In addition, to define a pocket for receiving heating pad 18, cover 20 is stitched along line 56 adjacent end 46 and is stitched along line 58 to form a marginal side portion 60. The outer side or surface of cover 20 is indicated at 62 and the inner side or surface of cover 20 is indicated at 64. Thus, cover 20 is substantially wider than heating pad 18 and marginal side portion or strip 60 may be easily folded inwardly along inner side 64 in lapping relation to heating pad 18 to adapt heating pad 18 for use with a container having a height lesser than the height of container 10. Outer plastic liner 54 is easily cleaned and is waterproof to provide a safety feature.

Figure 3:
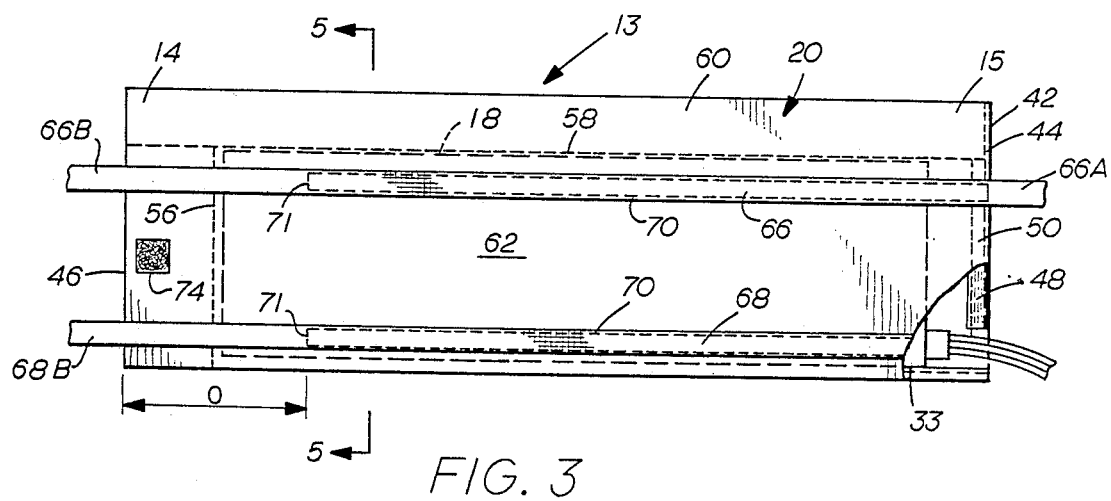
FIG. 3 is a top plan of the heating device shown in FIG. 1 removed from the container.
Figure 4:
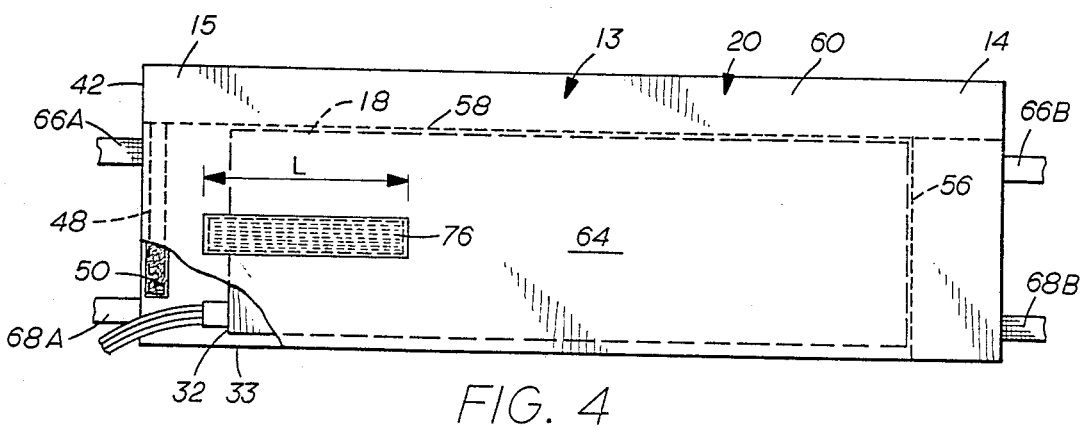
FIG. 4 is a bottom plan of the heating device shown in FIG. 3.

As shown particularly in FIGS. 2 and 3, a pair of spaced parallel string or ribbon ties 66 and 68 are stitched at 70 to outer side 62 of cover 20 and have free end portions 66A, 68A adjacent end 42 and free end portions 66B, 68B adjacent end 46 It is noted that stitching 70 adjacent end 46 ceases at 71 to provide free end portions 66B, 68B unsecured to inner overlapping end portion 14 which permits outer overlapping end portion 15 to lap end portion 14 under free end portions 66B, 68B without any lapping of heating pad 18. The unstitched length of end portions 66B, 68B is illustrated by the dimension 0 in FIG. 3 and this provides an adjustable feature to permit the overlapping of end portion 15 for fitting about containers having various circumferential dimensions. For maintaining heating device 13 in a secured position while free end portions 66A, 68A and 66B, 68B are tied to each other to form bows 16, a relatively small length Velcro strip 74 is positioned on outer side 62 of cover 20 forming inner overlapping end portion 14. A matching relatively long Velcro strip 76 is positioned on inner side 64 of cover 20 and is of a length L substantially the same as length O shown in FIG. 3 representing the unstitched length of end portions 66B, 68B adjacent end 46. The length of strip 76 is around four (4) times the length of strip 74 thereby to permit adjustment of overlapping end portions 14, 15.

For wrapping heating device 13 about container 10 with heating pad 18 secured within the pocket of outer cover 20 and open end 46 closed by strips 48 and 50, end portion 14 having strip 74 thereon is held against the outer surface of container 10 and heating device 13 is then wrapped around container 10 with end portions 14 and 15 lapping each other. Strip 76 is then pressed into engagement with strip 74 to hold heating device 13 in tight position about container 10 without any lapping of heating pad !8 within cover 20 which is of a substantially shorter length than the length of cover 20. In this position, the ends 66A, 68A, and 66B, 68B may be tied into the bows 16 to present a pleasing appearance and to maintain overlapping end portions 14, 15 in position thereof as shown in FIG. 1. As indicated, the outer side of cover 20 comprising inner liner 52 and outer liner 54 may be formed with various designs thereon such as by embossments or coloring to present a pleasing appearance.

Figure 7:
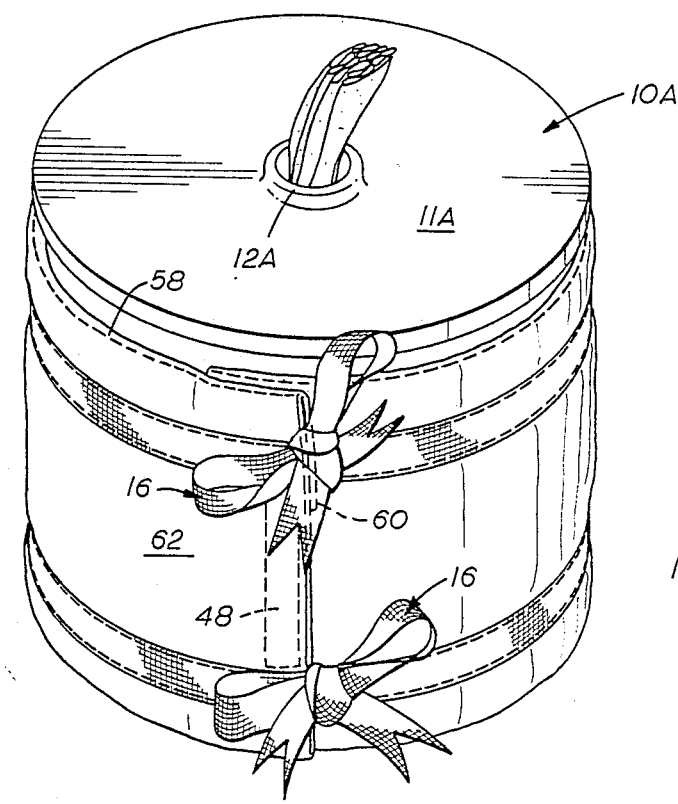
FIG. 7 is a perspective view similar to FIG. 1 but showing the heating device comprising the present invention adapted for fitting around a container having a height less than the height of the container in FIG. 1.

Referring to FIG. 7, heating device 13 forming the present invention is shown positioned about a container 10A having a lid 11A thereon with a suitable opening 12A therein to permit the withdrawal of a moist tissue from container 10A. Container 10A is of a height substantially less than the height of container 10. To adapt heating device 13 for fitting about container 10A, marginal side flap 60 is folded in about stitching 58 against inner side 64 and in this position, heating device 13 is then wrapped and secured to container 10A in the same manner as it is secured about container 10. It is apparent from the foregoing that the improved heating device 13 comprising the present invention is particularly adapted to be wrapped around and secured to containers of various heights and various circumferential dimensions.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. For a container having a substance therein adapted to be warmed for use;
   an improved electrical warming device for the container adapted to be wrapped about the outer periphery of the container for maintaining the substance at a predetermined warm temperature; said warming device being of a generally rectangular shape having a width generally less than the height of the container and a length sufficient to wrap around the outer periphery of the container and provide overlapping end portions;

said warming device including an inner electrical heating pad of a generally rectangular shape having electrical resistance heating coils therein and an electrical cord extending therefrom with a plug on its extending end adapted to be inserted within a suitable electrical outlet connected to a source of electrical energy for heating said inner pad, and an outer cover of a generally rectangular shape forming an elongated pocket extending along its longitudinal axis and having closed sides for removably receiving said inner pad therebetween, said cover having one end closed and the opposite end open for receiving said pad and including means for closing said opposite end upon insertion of said heating pad within said pocket and for subsequent opening to permit removal of the heating pad; and means on the warming device to releasably secure the overlapping end portions of said warming device about said container for tightly mounting the warming device thereabout.

2. The improved electrical warming device as set forth in claim 1 wherein said means to secure the overlapping end portions comprises a pair of ribbon-like ties secured to said outer cover and adapted to be tired manually to each other.

3. The improved electrical warming device as set forth in claim 1 wherein said means to secure the overlapping end portions comprises a pair of complementary nylon strips on said end portions, one strip having a surface of tiny hooks and the other strip having a complementary surface of adhesive pile, said strips adapted to be pressed together for fastening and to be pulled apart for unfastening.

4. The improved electrical warming device as set forth in claim 1 wherein said electrical cord extends from a corner of the pad adjacent the open end of said cover and outwardly from said open end.

5. The improved electrical warming device as set forth in claim 1 wherein said cover has a width substantially greater than the width of said heating pad to form a marginal side portion extending beyond said inner heating pad and to be selectively folded inwardly thereby to decrease the width of said heating device to adapt the heating device for use with a container having a lesser height.

6. In combination with a container having a plurality of moist tissues therein adapted to be individually withdrawn from the container for use in wiping babies or the like;

an improved electrical warming device for the container adapted to be wrapped about the outer periphery of the container for maintaining the moisture tissues at a predetermined warm temperature comfortable to the skin of a baby; said warming devices being of a generally rectangular shape having a width generally less than the height of the container and a length sufficient to wrap around the outer periphery of the container and provided overlapping end portions;

said heating device including an inner electrical heating pad of a generally rectangular shape having electrical resistance heating coils therein and an electrical cord extending therefrom with a plug on its extending end adapted to be inserted within a suitable electrical outlet connected to a source of electrical energy for heating said inner pad, and an elongate outer cover of a generally rectangular shape forming a pocket receiving said inner pad, said cover having one end closed and the opposite end open for receiving said pad; and means on the outer cover to secure the overlapping end portions of said warming device about said container for tightly mounting the warming device thereabout;

said cover having a length extending between said ends and a width substantially greater than the width of said heating pad to form a marginal side portion extending beyond said inner heating pad, said marginal side portion being selectively foldable inwardly to lap said heating pad thereby to decrease the width of said heating device and permit the heating device to be used with a container having a lesser height.

7. The combination set forth in claim 6 wherein said cover has a plurality of layers secured to each other, the outer layer being plastic and adapted to be embossed with preselected designs.

8. The combination set forth in claim 6 wherein said means on the outer cover to secure the overlapping end portions of said warming device comprises a pair of ties secured to the overlapping end portion with the ties adjacent one of the overlapping and portion having free end portions unsecured to said one overlapping end portion.

9. The combination as set forth in claim 6 wherein said means on the outer cover to secure the overlapping and portions of said warming device comprises a pair of matching nylon securing strips on said outer cover, one of said strips being on the inner surface of the outer overlapping end portion and the other of said strips being on the outer surface of said inner overlapping end portion.

10. The combination as set forth in claim 9 wherein said nylon securing strip on the inner surface of said outer overlapping end portion is of a length substantially greater than the length of the other nylon securing strip.

11. The combination as set forth in claim 10 wherein said nylon securing strip on the inner surface of said outer overlapping end portion has a length at least three times the length of the other nylon securing strip.

12. In combination with a container having a substance therein desired to be warmed for use;

an improved electrical warming device for the container adapted to be wrapped about the outer periphery of the container for maintaining the substance therein at a predetermined warm temperature comfortable for use; said warming device being of a generally rectangular shape having a width generally less than the height of the container and a length sufficient to wrap around the outer periphery of the container and provide overlapping end portions;

said heating device including an inner electrical heating pad of a generally rectangular shape having electrical resistance heating coils therein and an electrical cord extending therefrom with a plug on its extending end adapted to be inserted within a suitable electrical outlet connected to a source of electrical energy for heating said inner pad, and an outer cover of a generally rectangular shape forming an elongated pocket extending along its longitudinal axis and having closed sides for removably receiving said inner pad therebetween, said cover having one end closed and the opposite end open for receiving said pad and including means for closing said opposite end upon insertion of said heating pad within said pocket and for subsequent opening to permit removal of the heating pad; and a pair of generally parallel ties secured to the outer surface of said outer cover and having end portions extending beyond the ends of said outer cover of a length sufficient to form a suitable ties bow when the end portions for each tie are secured to each other, the end portions of said ties on one end of said outer cover adjacent the inner overlapping end portion being unsecured to said outer cover for the entire inner overlapping end portion of the heating device thereby to permit the free end portions of the ties to overlap the outer overlapping end portion of the heating device.

13. The combination as set forth in claim 12 wherein a pair of matching nylon securing strips are mounted on said outer cover, one of said strip being on the inner surface of the outer overlapping end portion between said ties and the other of said strips being on the outer surface of the inner overlapping end portion between said ties.

14. The combination as set forth in claim 13 wherein said nylon securing strip on the inner surface of said outer overlapping end portion is of a length substantially greater than the length of the other nylon securing strip.

15. The combination as set forth in claim 14 wherein said ties are ribbon-like ties adapted to have their end portions tied into fanciful bows.

16. The combination as set forth in claim 12 wherein manual control means permit said heating device to be adjusted for selected predetermined temperatures.

* * * * *